United States Patent
Borrelli et al.

(10) Patent No.: US 7,829,489 B2
(45) Date of Patent: Nov. 9, 2010

(54) LOW CTE PHOTOMACHINABLE GLASS

(75) Inventors: Nicholas Francis Borrelli, Elmira, NY (US); Kathryn L Goetschius, Wellsville, NY (US); David Lathrop Morse, Corning, NY (US); Charlene Marie Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 570 days.

(21) Appl. No.: 11/897,905

(22) Filed: Aug. 31, 2007

(65) Prior Publication Data

US 2008/0299501 A1 Dec. 4, 2008

Related U.S. Application Data

(60) Provisional application No. 60/932,463, filed on May 31, 2007.

(51) Int. Cl.
*C03C 4/00* (2006.01)
*C03C 14/00* (2006.01)
*C03C 3/095* (2006.01)
*C03C 3/085* (2006.01)

(52) U.S. Cl. .............................. 501/13; 501/32; 501/34; 501/38; 501/39; 65/33.2

(58) Field of Classification Search .................... 501/13, 501/32, 64, 68, 69; 65/33.2
See application file for complete search history.

(56) References Cited

U.S. PATENT DOCUMENTS

| | | | |
|---|---|---|---|
| 2,515,939 A | 7/1950 | Stookey | |
| 2,515,941 A | 7/1950 | Stookey | |
| 2,559,805 A | 7/1951 | Stookey | |
| 2,628,160 A | 2/1953 | Stookey | |
| 2,651,145 A | 9/1953 | Stookey | |
| 2,651,146 A | 9/1953 | Stookey | |
| 2,684,911 A | 7/1954 | Stookey | |
| 4,684,222 A * | 8/1987 | Borrelli et al. | 359/671 |
| 5,534,321 A * | 7/1996 | Alpha et al. | 428/64.2 |
| 7,241,559 B2 * | 7/2007 | Borrelli et al. | 430/321 |
| 7,262,144 B2 * | 8/2007 | Schreder et al. | 501/66 |
| 2004/0126698 A1 * | 7/2004 | Borrelli et al. | 430/270.1 |
| 2004/0180773 A1 * | 9/2004 | Schreder et al. | 501/7 |

FOREIGN PATENT DOCUMENTS

JP 61063542 A * 4/1986

OTHER PUBLICATIONS

Derwent Abstract 1986-123192, English Abstract of JP 61-063542 A, Apr. 1, 1986.*

* cited by examiner

*Primary Examiner*—Karl E Group
*Assistant Examiner*—Elizabeth A Bolden
(74) *Attorney, Agent, or Firm*—Walter M. Douglas

(57) ABSTRACT

The present invention describes a composition, method and article for a photomachinable glass having a coefficient of thermal expansion from less than $6 \times 10^{-6}/°C$. in the temperature range of 0° C. to 300° C. The photomachinable glass composition is a low expansion glass having an amorphous glass phase and crystalline phases selected from the group consisting of spudomene and lithium disilicate.

4 Claims, 3 Drawing Sheets

LOW CTE PHOTOMACHINABLE GLASS

PRIORITY

This application claims the priority and benefit of U.S. Provisional Application No. 60/932,463 titled "LOW CTE PHOTOMACHINABLE GLASS" filed May 31, 2007.

FIELD OF THE INVENTION

The invention relates to a composition and method for producing a photomachinable ("PM") glass that can be photo-patterned and etched to form a patterned article that can be converted into an article having a coefficient of thermal expansion that is substantially lower then the coefficient of thermal expansion of prior art photomachinable products or articles.

BACKGROUND OF THE INVENTION

Two photomachinable ("PM") glass compositions, known under the name Fotoform™ (Corning Incorporated) and Foturan® (Schott Glass). By photomachinable is meant that after the glass is covered with a patterned photomask and exposed to actinic radiation, preferably UV light, followed specified thermal treatment, the resulting glass-crystal composite material, in the area not covered by the photomask (that is, the exposed or pattern areas) is preferentially soluble in hydrofluoric acid relative to the unexposed glass. This permits one to make patterns of holes and cavities utilizing a conventional photolithographic process. There were numerous commercial applications that utilized this patented material where the refractive nature of the material along with chemical durability, non-magnetic and electrical insulating properties made it unique. However, one property that limited its application was a relatively high coefficient of thermal expansion ("CTE"). The Corning Fotoform™ material has a CTE of $8.4\times10^{-6}/°$ C. and the Schott Foturan® material has a published CTE of $8.6\times10^{-6}/°$ C.

Photomachinable glasses are based on photosensitively opacifiable glasses (also called "opal glasses") having a lithium disilicate and/or lithium metasilicate (also called lithium monosilicate) crystallite phase. Photosensitively opacifiable glasses which do not contain lithium are described U.S. Pat. Nos. 2,515,939, 2,515,941, 2,559,805, 2,651,145, and 2,651,146. Photosensitively opacifiable glasses that do contain lithium disilicate and/or lithium metasilicate are described in U.S. Pat. Nos. 2,515,940, 2,628,160 and 2,684,911. Opal glasses with patterns or designs are formed by masking an appropriate glass composition with a patterned mask, subjecting it to radiation in a photolithographic process and a subsequent heat treatment as briefly described in the preceding paragraph and in detail in U.S. Pat. Nos. 2,515,939, 2,515,941, 2,559,805, 2,651,145, and 2,651,146. In addition, U.S. Pat. Nos. 2,628,160 and 2,684,911 describe the chemical machining of an opalized glass (photosensitive) containing lithium disilicate and/or lithium metasilicate, for example, by use of a dilute hydrofluoric acid solution. The radiation used in the foregoing patents was supplied using ultraviolet emitting lamps, for example, Hg or Hg—Xe arc lamps, which flooded the entire surface (lithographic mask and exposed glass) of the article being irradiated with less than 400 nm radiation. U.S. Pat. No. 2,515,939 indicates that generally the time and intensity of the radiation necessary to produce the desired effect was determined by trial. U.S. Pat. No. 2,515,941 indicates that for a given composition different colors can be developed in the glass using different radiation exposure times.

While the properties of the known PM glasses have enabled a number of uses, it is highly desirable to have a PM glass that has a lower CTE value to extend the use of photomachinable glasses. In particular, it is desirable to have a PM glass having a CTE that more closely matches that of silicon (CTE approximately $2.6\times10^{-6}/°$ C.) because this feature will permit a wider range of new possible applications.

SUMMARY OF THE INVENTION

The present invention describes a composition and a method for producing a photomachinable glass with a CTE in the range of 4 to less than $-6\times10^{-6}/°$ C.
[4 to $<6\times10^{-6°}$ C.] from 0° C. to 300° C. The invention also includes a glass article produced from the composition and method.

The method includes applying a patterned photomask to a PM glass substrate; exposing the photomasked glass substrate to a actinic radiation, particularly actinic radiation in the ultraviolet wavelength range; removing the photomask; heat treating the glass substrate at a temperature in the range of 500° C. to 650° C. to form a lithium metasilicate crystalline phase in the range of 15-25 vol. %, the glass phase being in the range of 75-85 vol. %, in those areas of the glass substrate that were not masked by the photomask and which were exposed to the actinic radiation; etching the glass to remove materials from those areas of the glass that were irradiated, and subjecting the etched glass to a second heat treatment at temperature above about 800° C., typically a temperature in the range of 800-900° C., to form one or a plurality of crystalline phases, in the portion of the glass that was not exposed to the actinic radiation, that lower the overall CTE of the glass substrate. After the second heat treatment the resulting substrate has a crystalline phase in the range of 75-95 vol. % and a glass phase in the range of 5-25 vol. %. In another embodiment, after the second heat treatment the resulting substrate or article has a crystalline phase in the range of 80-90 vol. % and a glass phase in the range of 10-20 vol. %.

The article of the invention is a article formed from a PM glass that, after being masked, subjected to actinic radiation, heat treated at a temperature in the range of 500-600° C., etched and subjected to a second heat treatment at a temperature in the rage of 800-900° C., is a glass article having a 80-90 vol. % crystalline phase.

The invention is further directed to a method for lowering the coefficient of thermal expansion ("CTE") of a known PM glass composition without effecting the photomachinability properties of the glass composition, the method comprising changing the content in a glass composition of a CTE lowering component already present in the composition with corresponding adjustment of the content of other components in the composition and additionally subjecting the composition of to a first heat treatment step to form first lithium metasilicate phase within the glass composition and a second, higher temperature heat treatment step to form the first crystalline phases within the glass to second crystallite phases within the glass composition that lower the overall or net CTE of the glass composition.

The invention is also directed to a method for producing an article, substrate or other item from a CTE photomachinable glass composition comprising at least the steps of:
preparing a photomachinable glass composition capable of forming crystals within the glass upon heat treatment to thereby form a material having an amorphous glass component and crystalline component having one or a plurality of crystallite phases, said glass having a CTE in the range of 4 to less 6×10⁻⁶/° C. from 0° C. to 300° C.;

forming the glass into an article suitable for the intended use;

placing a photomask having a pattern over the article and exposing the photomasked article to ultraviolet radiation from an ultraviolet radiation source;

subjecting the formed glass to a first heat treatment at a temperature in the range of 500° C. to 650° C. to form a crystallite phase in the portions of the article that were exposed to ultraviolet radiation etching the article using an etching solution to remove the crystallite phase from the article glass and form a patterned article; and subjecting the resulting patterned article to a second heat treatment at a temperature higher that the first heat treatment temperature to form at least one CTE lowering crystallite phase in the portion of the article that was not exposed to the ultraviolet radiation to thereby lower the overall or net CTE of the glass composition and article, substrate or other item made therefrom. The source of the ultraviolet radiation can be an ultraviolet flood lamp or a laser operating in the ultraviolet wavelength range. The glass composition used in practicing the method comprises, in weight percent (wt. %), 74-81% silica ($SiO_2$), 4.5-10% alumina ($Al_2O_3$), 8.8-10.1% lithium oxide ($Li_2O$), greater than zero to less than 0.3% cerium oxide (>0 to <0.1% $CeO_2$), 1.5-1.7% zinc oxide (ZnO), 1.2-1.6% sodium oxide ($Na_2O$), 2.2-3.8% potassium oxide ($K_2O$), >0 to 0.25% $Sb_2O_3$, less than 0.1% tin oxide ($SnO_2$), and from greater than zero up to 0.3% of at least one metal selected from the group of gold (Au) and silver (Ag), or mixtures thereof, provided that the sum of Au+Ag is not greater than 0.3%.

In another embodiment, the method optionally comprises subjecting the glass composition to a second UV irradiation after etching but before the second heat treatment at a temperature higher than the first heat treatment temperature to reduce glass deformation during the second heat treatment. The second heat treatment temperature is preferably in the of 800-900° C.

DETAILED DESCRIPTION OF THE INVENTION

Figure 1:
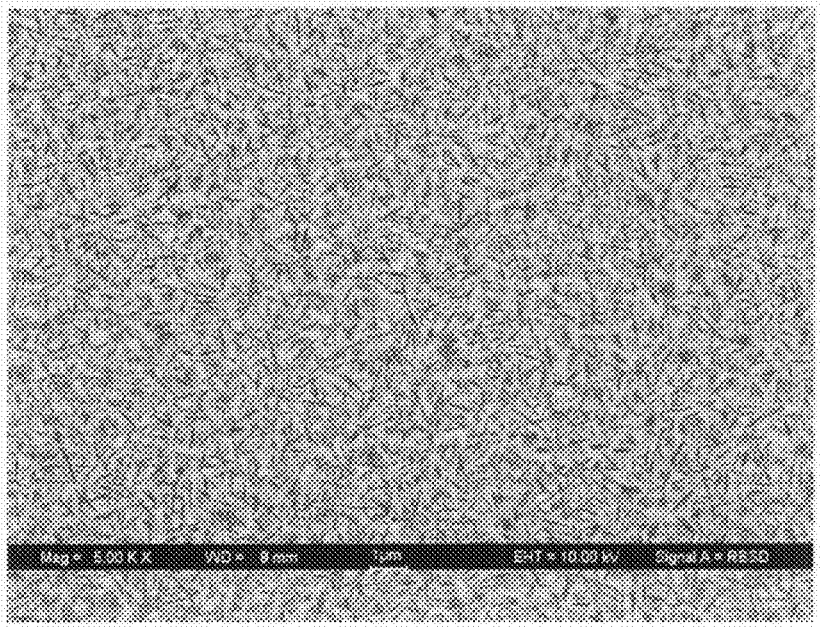
FIG. 1 is photomicrograph of a prior art photomachinable glass composition after exposure and heat treatment.

As used herein the terms "photomachinable glass", "PM glass", "PM glass article" and similar terms are used to describe glass compositions that meet the definition of "photomachinable" as described herein. The term "photomachinable" may be viewed as a combination of the terms "photolithographicable" and "chemically machinable." As also used herein the terms "substrate" and "article" mean a material of any shape that is made of a photomachinable glass, and the terms may be used interchangeably.

By photomachinable is meant that after the glass is covered with a patterned photomask and exposed to actinic radiation, preferably UV light, followed specified thermal treatment, the resulting glass-crystal composite material, in the area not covered by the photomask (that is, the exposed or pattern areas) is preferentially soluble in hydrofluoric acid relative to the unexposed glass. This permits one to make patterns of holes and cavities utilizing a conventional photolithographic process. Exposure of the PM glass to actinic radiation followed by a heat treatment at a temperature in the range of 500-650° C. increases the sensitivity of the exposed glass to etching by an etching material, for example hydrofluoric acid. The sensitivity of the exposed (irradiated) glass to etching (that is, the ease at which the exposed material can be etched) can be up to twenty times higher than that of the unexposed glass. These disparate solubilities between the radiation-exposed glass and the unexposed glass permit the creation of complex shapes by preferential etching of the exposed glass. For example, without limitation, the shapes include depressions, holes, cavities and channels.

Photomachinable glass materials allow for the masking of portions of the glass or glass article (collectively herein "article"), leaving other portions unmasked. The article is then exposed to actinic radiation which affects the unmasked portions of the article during irradiation while leaving the masked portions unaffected while the exposed or unmasked portions glass article undergo a phase and morphological change. Subsequently, the article is heat treated at a temperature in the range of 500° C. to 650° C. to form a crystalline phase within the glass that is more easily etched than the glass materials itself. The article is then etched, typically using a hydrofluoric acid etching solution. One skilled in the art is aware of many masking techniques including photolithography. Masking permits complex patterns to be created in the glass.

The common method of irradiating and etching a PM glass includes masking the glass with the desired pattern, exposing the glass to ultraviolet light in the wavelength range of 100-400 nm (typically at a wavelength between 290-330 nm), heat treating the glass between 500° C. and 650° C. for approximately one hour, and etching the article with hydrofluoric acid. Irradiation typically affects the glass to a depth of about 1-2 mm, but the depth affected can vary depending on the wavelength, intensity and duration of the UV exposure. Heat treating is used to affect the crystallization process, which in the glasses described herein results in the formation of lithium metasilicate crystallites within the PM glass substrate. Etching may occur, for example, with a 10% solution of hydrofluoric acid, and may employ any convenient technique, including immersion, ultrasonic, or spraying.

The present invention includes a PM glass composition and a method of manufacturing using the same that produces an article having a coefficient of thermal expansion less than 6×10⁻⁶/° C. in the temperature range of 0° C. to 300° C., and typically from 4 to <6×10⁻⁶/° C. in the temperature range of 0° C. to 300° C. The glass composition comprises, in weight percent (wt. %):

74-81% silica ($SiO_2$), 4.5-10% alumina ($Al_2O_3$), 8.8-10.1% lithium oxide ($Li_2O$), greater than zero to less than 0.3% cerium oxide (>0 to <0.1% $CeO_2$), 1.5-1.7% zinc oxide (ZnO),
1.2-1.6% sodium oxide ($Na_2O$),
2.2-3.8% potassium oxide ($K_2O$),
>0 to 0.25% $Sb_2O_3$,
less than 0.1% tin oxide ($SnO_2$), and
from greater than zero up to 0.3% of at least one metal selected from the group of gold (Au) and silver (Ag), or mixtures thereof, provided that
the sum of Au+Ag is not greater than 0.3%

Typically, except for the metals Au and Ag, oxides, metal carbonates, hydroxides and hydrates thereof, or mixtures of any of the foregoing, are used in preparing the photomachinable glass compositions. While Au and can be added as oxides, metal carbonates, hydroxides and hydrates, it is preferred that they be added as halides (Cl, Br and I), nitrates, nitrites or other compounds known in the art to be useful for making photosensitive, photochromic or polarizing glasses.

The PM glass composition, after being formed into a suitable glass substrate, is photomasked such that there are areas covered by the photomask and areas that are not covered by the photomask, and irradiated with a wavelength from about 290-800 nm, and preferably from 290-330 nm. The substrate, after irradiation and removal of the photomask, is then heat treated at a temperature above about 500° C., and preferably from 500° C. to 650° C. One skilled in the art would appreciate the permitted variations on heat treating, including time and temperature parameters. After removal of the photomask the substrate is etched using an etching solution as described herein to remove the lithium metasilicate formed during the heat treatment. Finally, and unlike prior art, the heat treated glass is then subjected to a second heat treatment at a temperature above about 800° C., preferably a temperature in the range of 800-900° C., for a time at least about one hour to form the article having low CTE crystalline phases. The low CTE phases are formed as a result of the heat treatment at a temperature above 800° C. As indicated for the glass composition described herein, the inclusion of alumina in an amount of 4.5-10 wt. % results in a PM glass that has a lower CTE than photomachinable glasses of the prior art. The resulting glass is thus less susceptible to shock, particularly thermal shock, than the PM glasses of the prior art. The lithium metasilicate phase is also maintained after the initial heating to a temperature in the range of 500° C. to 600° C.

Figure 5:
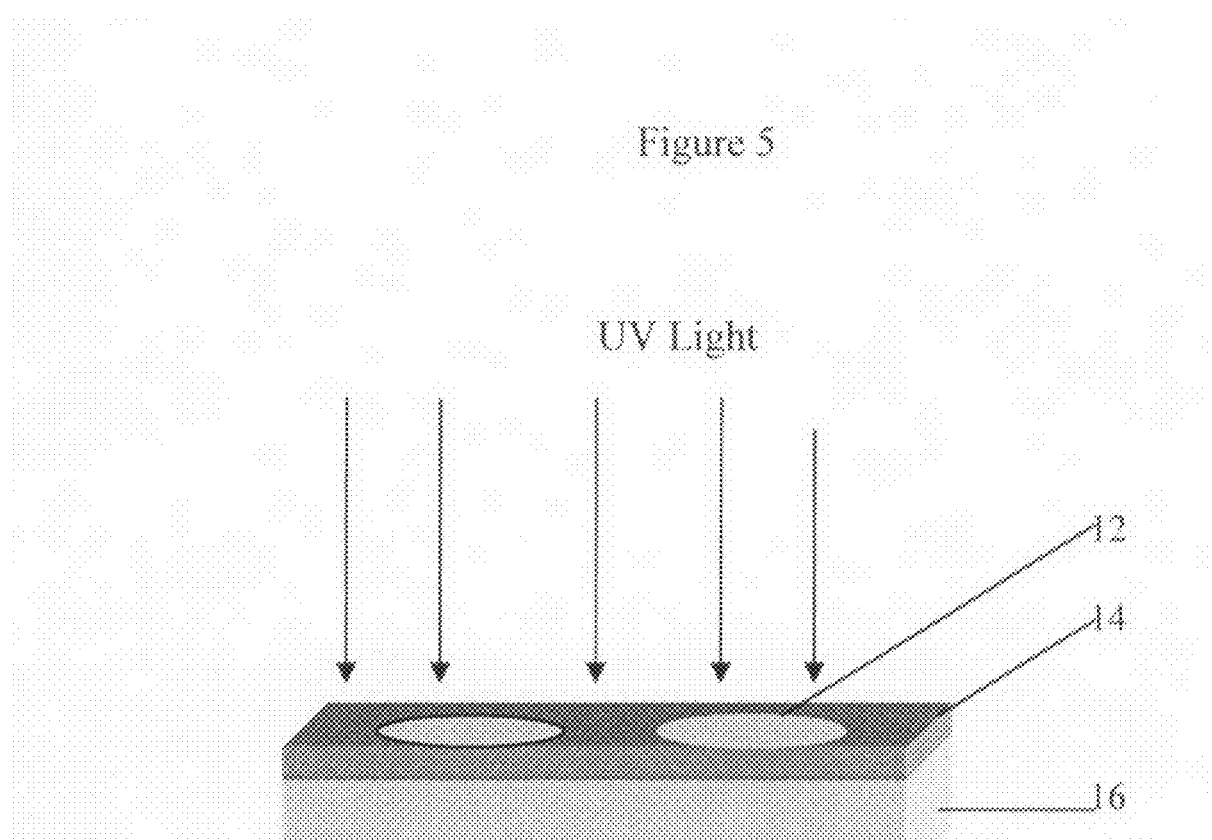
FIG. 5 illustrates a substrate having a patterned photomask (with openings 12) thereon being subjected to UV radiation.
Figure 6:
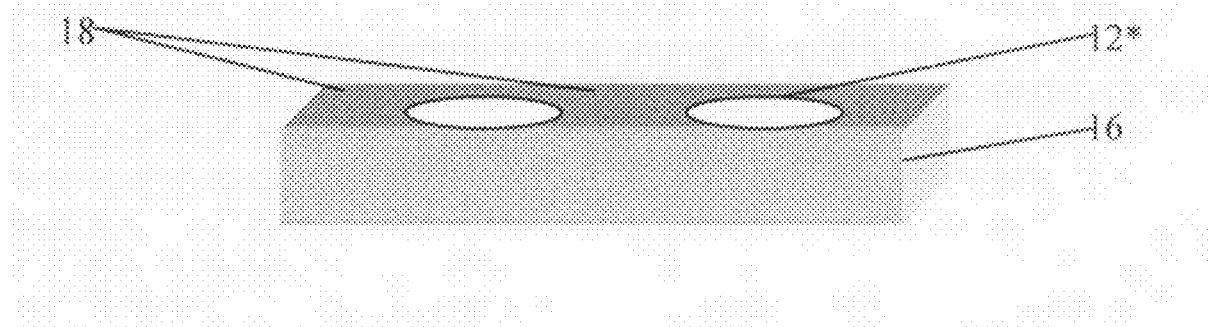
FIG. 6 illustrates the substrate of FIG. 5 after UV radiation exposure and photomask removal, and areas 12* that were subject to UV radiation and are etchable after a first heat treatment.

A sample of a glass having an analyzed composition, in weight percent, of 75.5% $SiO_2$, 9.6% $Al_2O_3$, 9.5% $Li_2O$, 1.6% ZnO, 1.2% $Na_2O$, 2.4% $K_2O$, 0.22% $Sb_2O_3$ 0.018% $CeO_2$, 0% $SnO_2$, 0.0081% Ag and 0.0012% Au were prepared. The glass was formed into a substrate which was amorphous throughout. FIG. 5 illustrates a low CTE, photomachinable substrate 16, made from the foregoing glass, covered by a photomask 14 with openings 12 through the photomask being irradiated by UV light. After UV exposure the mask is removed. FIG. 6 illustrates substrate 16 after ultraviolet radiation exposure and photomask removal. In FIG. 6 the areas 12* represent the areas 12 of substrate 16 that were not covered by photomask 14 in FIG. 5 and areas 18 represent those areas that were covered by the photomask. That is, areas 12* are the areas that were exposed to the ultraviolet radiation due to openings 12 in photomask 14. The sample was heat treated at 600° C. and the areas 12* and 18 analyzed by X-ray diffraction. Following the analysis the sample was etched, heat treated at 850° C. and again analyzed by X-ray diffraction. The analysis, as shown in Table 1, indicates that the unexposed glass of areas 18 remained amorphous after heat treating at 600° C. and that low CTE crystalline phases formed in areas 18 after heat treating at 850° C.

TABLE 1

| Process Step | Result in Unexposed Area 18 | Result in Exposed Area 12* |
|---|---|---|
| 600° C. Heating | Amorphous | Lithium metasilicate produced |
| HF Etching | Essentially unetched | Etch away lithium metasilicate to produce photomachined pattern |
| 800° C. Heating | Amorphous material with pseudoeucryptite spudomene, lithium disilicate (low CTE phases) produced | Not applicable |

The pseudoeucryptite and spudomene phases are the low expansion phases that lower the overall CTE of the glass to the range 4 to <6×10$^{-6}$/° C. Table 1 shows the analysis of areas 12* that were exposed and etched before the 850° C. heat treatment. The analytical results indicate that lithium metasilicate was formed in the glass after it was heat treated at 600 and that this phase was removed by the etching step to produce the photomachined pattern. The CTE of the glass was measured by dilitometry and has a value 5.6×10$^{-6}$/° C. which is within the range 4 to <6×10$^{-6}$/° C. The results clearly indicate that the glass compositions of the invention form a low CTE, photomachinable glass.

The glass of the invention, while having a lower CTE than prior art PM glasses, retains the etching characteristics of the prior art PM glasses. Thus, the PM glass of the invention, in addition to being photosensitive, is photomachinable. By photomachinable is meant that after the glass is exposed to UV ("ultraviolet") light and then given a specified thermal treatment at a temperature in the range of 500° C. to 650° C. that produces at least one crystal phase within the glass, the resulting glass-crystal composite material is preferentially soluble in hydrofluoric acid relative to the unexposed, non-thermally treated glass. The foregoing properties and process allows one to make patterns of holes and cavities utilizing a conventional photolithographic process. There were numerous commercial applications that utilized the conventional photomachinable material, known as Fotoform™, where the refractive nature of the material along with chemical durability, non-magnetic and electrical insulating properties made it unique. However, one property that limited the applications in which the Fotoform material could be used was its relatively high coefficient of thermal expansion ("CTE"). A lower CTE value more closely matching that of silicon is a desirable feature and that opens up a wider range of possible applications; for example as a substrate for silicon based electronic devices. The low CTE PM glass described herein makes possible these applications.

The photomachinable metal includes stable metals in the +1 oxidation state. The stable metal may include gold and silver, and mixtures thereof. The photomachinable metal is conveniently introduced as a compound, for example silver chloride or silver nitrate. The concentration of photomachinable metal may affect the etchability, opacity, and color of the resultant glass.

Cerium oxide, $CeO_2$, is added to increase the photosensitivity of the photomachinable metal. Without intending to be bound by this explanation, cerium in the +3 oxidation state, absorbs at 310 nm corresponding to the 4f-5d transition, thereby freeing an electron for reduction of the photomachinable metal. Heating the exposed material permits diffusion of elements in the glass and precipitation of the reduced metal. The reduced metal nucleates lithium metasilicate.

There are really three separate phenomena that ultimately determine the optimum exposure. However, it is difficult to separate the UV exposure level and the thermal development schedule, but for the sake of illustration we are going to assume that the latter is a fixed schedule. Without being held to any particular theory it is believed that the following discussion is an accurate of what occurs when one forms, irradiates heats treats and etches articles using a PM glass.

The first step is the photo excitation and trapping of an electron from somewhere. In the Fotoform glasses this process is aided by the addition of $Ce^{+3}$. The $Ce^{+3}$ has a characteristic absorption feature at 310 nm corresponding to the 4f-5d transition. It has been hypothesized that the 5d states of the $Ce^{+3}$ overlap (mix) to some extent with the conduction states of the glass. This essentially delocalizes the electron allowing it some range in the conduction band of the glass. The model is that some of these electrons get trapped into rather deep states. These states seem to be associated with non-bridging oxygen atoms simply because without non-bridging oxygen glasses are not photosensitive. Electron paramagnetic resonance (EPR) shows evidence of trapped electrons (holes) as well as an absorption edge shift after exposure to UV light. One can write Equation Set 1 representing these activities as follows, where hv is the photon of UV light, +3+represents an excited state $Ce^{+3}$ ion, e is an electron, T is an empty trap somewhat below the conduction band of the glass, $T_e$ is trapped electron, $e_v$ is a valence band electron, T' is an empty hole trap somewhat above the valence band, and $T_h$ is the filled hole trap

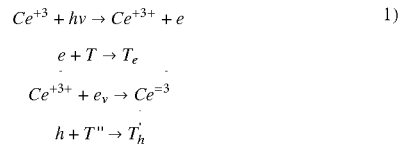

1)

The latter equations are suggested by the fact that the $Ce^{+3}$ absorption feature seems not to change during exposure that is the $Ce^{+3}$ is being replenished. All these phenomena occur at room temperature.

If one heats the glass sufficiently so that the electrons and holes are excited back into their respective bands of the glass we have the second step of the process. The elevated temperature (approximately 500° C.) produces another effect which is that is it gives the $Ag^{+1}$ ions contained within the glass mobility. For example, suppose the electrons are in shallow traps. Room temperature corresponds to 0.023 eV, thus a temperature of 500° C. corresponds to an energy of 0.06 eV When they are thermally excited out of these shallower traps they can either recombine with the holes in the valence band, or they can combine with a mobile $Ag^{+1}$ ion. Some authors have conjectured that the trap may very well be some sort of $Ag_n^+$ species. The competition then is between the recombination of the electrons in the conduction with the thermally released holes in the valence band and the $Ag_n^0$ formation. It is important that the trap depth of the holes is deeper than that of the electron trap allowing the electrons a greater range to combine with the $Ag^{+1}$. It has been shown that when one carries out the heating too rapidly one can favor the recombination and frustrate the silver formation because of the slower mobility of the $Ag^{+1}$ relative to the electron. This series of events is represented by Equation Set 2.

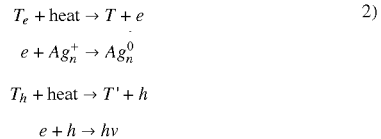

2)

The next step is the aggregation of the silver atoms into a silver particle. This step again requires heat primarily to allow the silver particle to grow. This is the classic photosensitive process leading to silver ruby glasses. In other words, when the final state is the silver particles ($Ag^0$), then the absorption of these metal particles produces the characteristic surface plasmon resonance one see at 400 nm for silver.

Nucleation of the Li-metasilicate by the silver particles occurs next. Although some authors like to separate the nucleation and growth temperature regimes, there is no doubt that the specific thermal schedule influences the number of nuclei and therefore the ultimate size of the meta-silicate grains. It is easy to see what is called over exposure where so many silver grains produced that the growth in size of the grain is limited. The visual characteristic is a colored glassy appearance rather than an opaque darkly colored one.

The various colors of the opal phase involve another step which may or may not be important. At the temperature that the metasilicate phase forms it also allows for the thermal reduction of the silver. Apparently the grains form nucleating places for this to happen. The colors therefore are the result of the silver decorating the metasilicate grains. If one lowers the silver from, for example, 0.1% (wt) to 0.0025 one can still get a dense opal phase but it is pure white. The reason is there is insufficient additional silver left in the glass to color it.

The ideal situation for effective and efficient etching is grains of sufficient size and number to form a contiguous grain structure. It is this condition that best exploits the differential solubility of the glass and the crystal. It would appear that the etch rate might depend more on the crystal growth and size properties, although the ultimate opal density (essentially defined as the number of grains per unit volume) might well be limited by the photosensitive aspects discussed herein.

Figure 2:
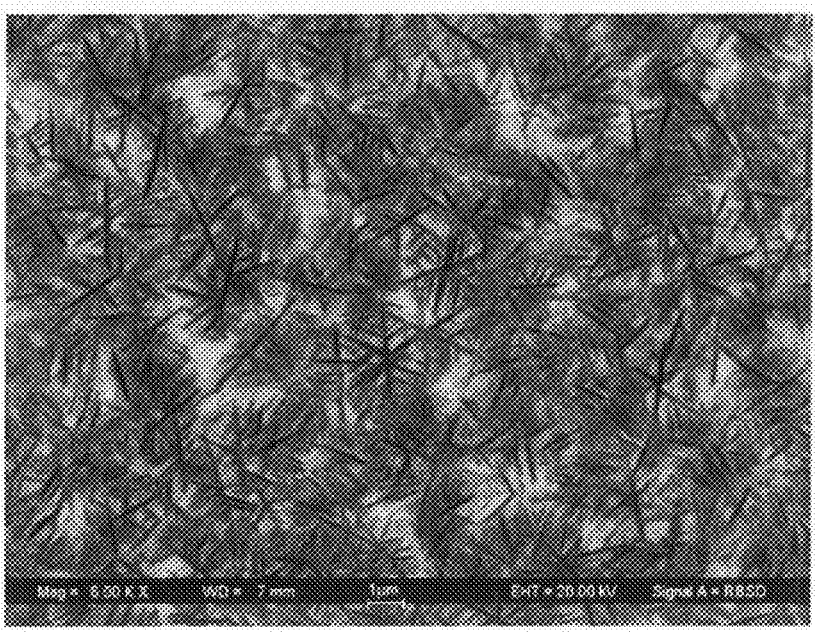
FIG. 2 is a photomicrograph of a photomachinable glass of the present invention after exposure and heat treatment.
Figure 3:
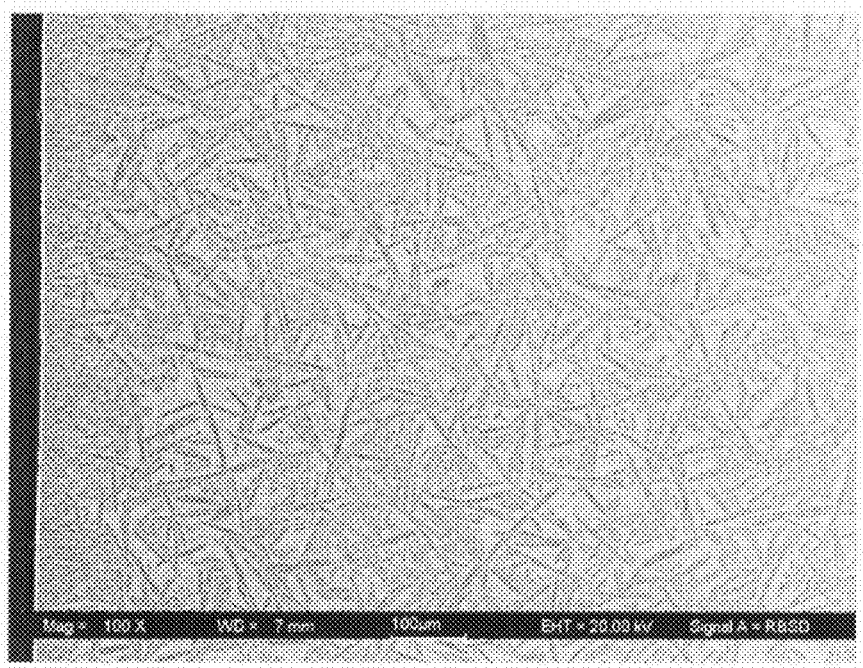
FIG. 3 is a photomicrograph of the photomachinable glass of FIG. 1 after heating at 850° C. for one hour.
Figure 4:
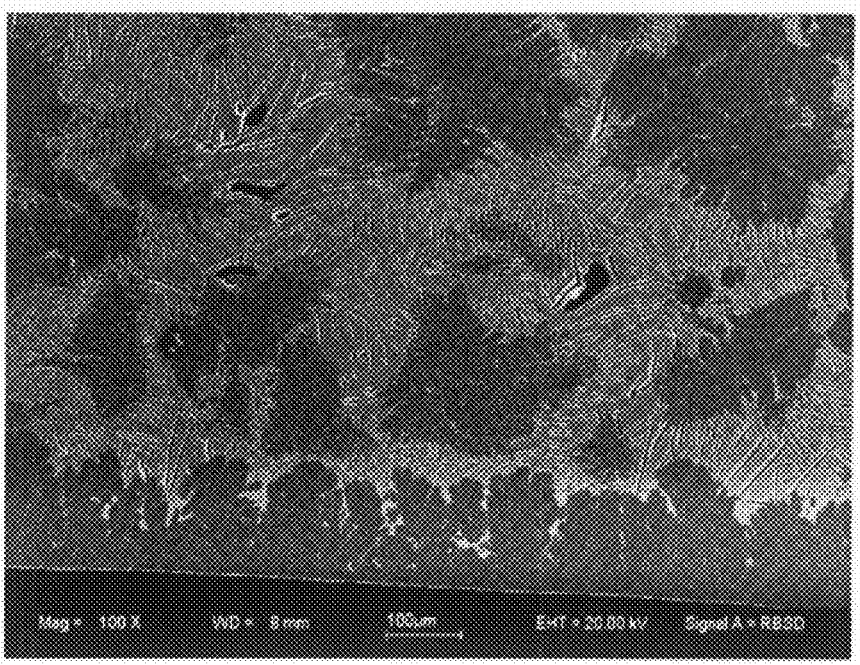
FIG. 4 is a photomicrograph of the photomachinable glass of FIG. 1 after heating at 850° C. for one hour.

The composition of the present invention includes 4.5-10 wt. % alumina, and preferably from 8-10 wt. % alumina. The composition is exposed and heat treated like the prior art to produce a dendritic morphology as is illustrated in FIG. 2. Like prior art, the composition may then be etched with an etching agent, for example hydrofluoric acid. Following exposure, heat treating and the optional etching, the composition is heat treated at a temperature above about 800° C. for a sufficient amount of time to convert substantially all of the lithium metasilicate to lithium disilicate, as shown in FIG. 4. Lithium disilicate has a much lower CTE than the metasilicate resulting in an annealed photomachinable glass with a CTE of $4-6\times10^{-6}$/° C. from 0° C. to 300° C. The PM glass of the invention maintains the same initial photo-nucleation and formation of the HF soluble Li-metasilicate phase as did the Fotoform glass so that patterning is the same as it would have been for Fotoform (compare FIG. 2 to FIG. 1, both after exposure and heat treatment).

The overall process for producing a formed article, substrate or other item has at least the steps of:

preparing a glass composition capable of forming crystals within the glass upon heat treatment to there from a material having an amorphous glass component and crystalline component having one or a plurality of crystallite phases;

forming the glass into a form suitable for the intended use;

masking the formed substrate with a patterned photomask and subjecting the masked substrate to actinic radiation;

subjecting the formed glass to a first heat treatment at a temperature in the range of 500-600° C. whereby the area that has been exposed to the actinic radiation forms a lithium metasilicate phase:

etching the substrate to remove lithium metasilicate material and thereby form a pattern on the substrate;

subjecting the resulting etched substrate to a second heat treatment at a temperature in the range of 800-900° C. to convert the glass that was not exposed to actinic radiation to one or a plurality of crystallite phases that have a lower CTE than lithium metasilicate.

In process described above the etching solution can be any etching solution capable of etching the crystallite-containing glass composition. Hydrofluoric acid etching solutions, buffered or unbuffered by the addition of ammonium bifluoride ($NH_4^{+1}$ $HF_2^{-1}$) are particularly useful for etching glass substrates. Hydrofluoric acid solutions of up to 20% HF can be used. Typically the etching solutions are in the range of 6-10% HF.

In another embodiment, the method of the invention optionally comprises subjecting the glass composition to a second UV irradiation, without masking, after etching but before the second heat treatment to increase crystallinity in the final product. The second irradiation will again nucleate the glass. In addition, after the second irradiation, the composition is again heat treated at the first heat treatment temperatures (500-600° C.) before being heat treated at the second heat treatment temperature (800-900° C.). Without being held to any particular theory, it is believed that as a result of the nucleation and the formation of a lithium metasilicate phase by heat treating at 500-600° C. crystallization will proceed more rapidly during the second heat treatment at a temperature in the range of 800-900° C. and/or more crystallites will be formed during this second heat treatment. Since the crystallinity is increased by the foregoing optional second irradiation and additional heat treating at 500-600° C. before the second heat treatment at 800-900° C., there is less glass flow during the second heat treatment.

GENERAL EXAMPLE

The following Table 2 gives the nominal values for a prior art composition (Fotoform® glass) and a composition according to the invention, including the CTE values for each. The Fotoform composition, even after subject to the second heat treatment at a temperature in the range of 800-900° C., did not have a lower CTE relative to Fotoform glass that was not subject to the second heat treatment.

TABLE 2

| Oxide (wt. %) | Fotoform Nominal | Invention Compositions | Example of the Invention, Glass A. |
| --- | --- | --- | --- |
| $SiO_2$ | 78.9 | 74-81 | 75.5 |
| $Al_2O_3$ | 4.3 | 4.5-10 | 9.6 |
| $Li_2O$ | 9.4 | 8.8-1.1 | 9.5 |
| ZnO | 0.96 | 1.5-1.7 | 1.6 |
| $Na_2O$ | 1.7 | 1.2-1.6 | 1.2 |
| $K_2O$ | 4.2 | 2.2-3.8 | 2.4 |
| $Sb_2O_3$ | 0.4 | <0.35 | 0.22 |
| $CeO_2$ | 0.018 | >0 to <0.3 | 0.013 |
| $SnO_2$ | 0.017 | <0.1 | 0 |
| Ag, when present | 0.11 | >0 to <0.3 | 0.081 |
| Au, when present | .0001 | >0 to <0.3 | 0.0012 |
| CTE* ($\times 10^{-6}$/° C.) | 8.4 | 4-6 | 4.9 |

Example 1

Two photomachinable glass compositions were compared. Glass A is a composition of the present invention comprising, by weight, 76% silica, 9.5% alumina, 9.5% lithium oxide, 1.6% ZnO, 1.2% $Na_2O$, 2.4% $K_2O$, 0% $SnO_2$, 0.081% Ag, 0.0012% Au and 0.013% cerium oxide. Glass B is a prior art composition (Fotoform) comprising, by weight, 79% silica, 4.3% alumina, 9.4% lithium oxide, 0.11% silver chloride, and 0.018 cerium oxide. Both glasses were irradiated with light of 330 nm radiation, for 4 minutes, heat treated at 650° C. for one hour, and then subsequently heat treated at 850° C. for one hour. Glass A had a CTE of $4.9 \times 10^{-6}$/° C. from 0° C. to 300° C., compared to Glass B with a CTE of $8.5 \times 10^{-6}$/° C. from 0° C. to 300° C.

Example 2

The etching rates of Glass A and Glass B, compositions as given in Example 1, were compared. Irradiation occurred with a wavelength of 330 nm. Separate samples of Glass A were exposed for 2 and 4 minutes. Glass B (Fotoform glass) received a standard exposure of 4 minutes. Etching was performed by immersion in a 10% solution of hydrofluoric acid. The etch rate of Glass B was 0.0130 mm/min. Glass A etched at rates of 0.0092 mm/min and 0.0143 mm/min at exposures of 2 min and 4 min, respectively. Glass A was at least as etchable as prior art, Glass B.

Obviously, numerous modifications and variations of the present invention are possible. It is, therefore, to be understood that within the scope of the following claims, the invention may be practiced otherwise than as specifically described. While this invention has been described with respect to certain preferred embodiments, different variations, modifications, and additions to the invention will become evident to persons of ordinary skill in the art. All such modifications, variations, and additions are intended to be encompassed within the scope of this patent, which is limited only by the claims appended hereto.

What is claimed:

1. A composition for a photomachinable glass comprising:
74-81% $SiO_2$,
4.5-10% $Al_2O_3$,
8.8-10.1% $Li_2O$,
greater than zero to less than 0.3% $CeO_2$,
1.5-1.7% ZnO,
1.2-1.6% $Na_2O$,
2.2-3.8% $K_2O$,
>0 to 0.25% $Sb_2O_3$,
less than 0.1% $SnO_2$, and
from greater than zero up to 0.3% of at least one metal selected from the group of gold (Au) and silver (Ag), or mixtures thereof, provided that the sum of Au+Ag is not greater than 0.3%, wherein said glass has a coefficient of thermal expansion less than $6 \times 10^{-6}$/° C. from 0° C. to 300° C. after heat treatment.

2. The composition according to claim 1, wherein said glass has a coefficient of thermal expansion in the range of 4 to less $6\times10^{-6}/°$ C. from 0° C. to 300° C. after heat treatment.

3. A photomachinable glass article comprising:
74-81% $SiO_2$,
4.5-10% $Al_2O_3$,
8.8-10.1% $Li_2O$,
greater than zero to less than 0.3% $CeO_2$,
1.5-1.7% ZnO,
1.2-1.6% $Na_2O$,
2.2-3.8% $K_2O$,
>0 to 0.25% $Sb_2O_3$,
less than 0.1% $SnO_2$, and
from greater than zero up to 0.3% of at least one metal selected from the group of gold (Au) and silver (Ag), or mixtures thereof, provided that the sum of Au+Ag is not greater than 0.3%, wherein said glass has a coefficient of thermal expansion less than $6\times10^{-6}/°$ C. from 0° C. to 300° C. after heat treatment.

4. The glass article according to claim 3, wherein said glass has a coefficient of thermal expansion in the range of 4 to less $6\times10^{-6}/°$ C. from 0° C. to 300° C. after heat treatment.

* * * * *